B. S. Roberts.

Cartridge Making Mach.

No. 3,423. Reissued May 4, 1869.

United States Patent Office.

BENJAMIN S. ROBERTS, OF THE UNITED STATES ARMY.

*Letters Patent No.* 87,593, *dated March* 9, 1869; *reissue No.* 3,423, *dated May* 4, 1869.

IMPROVED MACHINE FOR, AND METHOD OF COMPRESSING CARTRIDGE-SHELLS TO A TAPERED FORM.

The Schedule referred to in these Letters Patent and making part of the same.

*To all whom it may concern:*

Be it known that I, BENJAMIN S. ROBERTS, of the United States Army, have invented a new and useful Improvement in the Manufacture of Cartridge-Cases; and I do hereby declare the following to be a full and exact description thereof, which will be better understood by reference to the accompanying drawings.

It is very important, whenever metallic cases of any kind are used, that such cases, as well as the chamber in which they are to be exploded, should be slightly tapered, so, that when retracted ever so little, they will be loosened, and become easily removed from the chamber.

I propose to construct the cartridge-cases in a cylindrical shape, which is readily done. It is then of the form shown in Figure 1.

Figure 3:
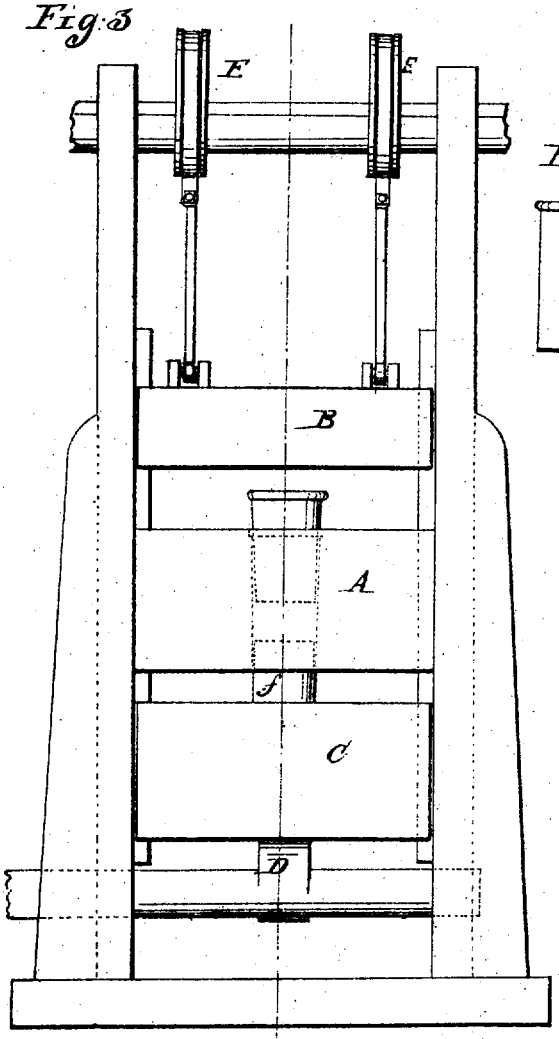
Figure 1:
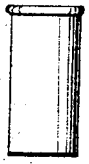
Figure 2:
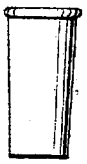

It is then inserted in the die A, Figure 3, in which there is a tapering aperture, made a shade larger at the top than the external diameter of the cartridge-case, fig. 1.

A plunger, B, worked by the eccentrics E E, then presses the case into the die, which gives it the desired taper, and is, moreover, sure to make them all of precisely the same size and shape, which is found of great advantage when they come to be used.

Figure 4:
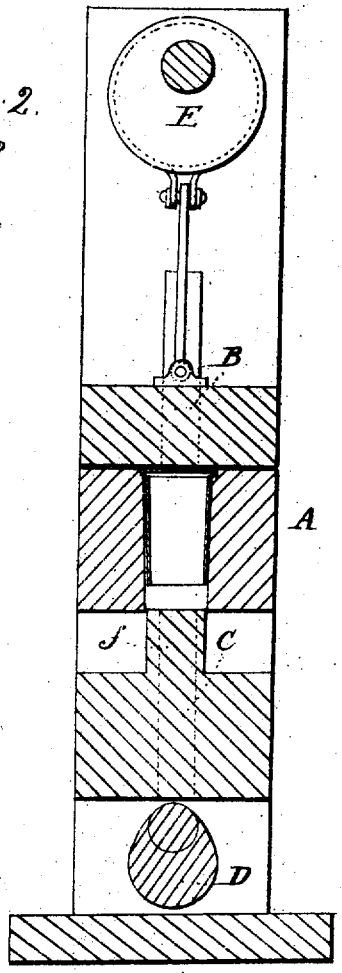
Figure 5:
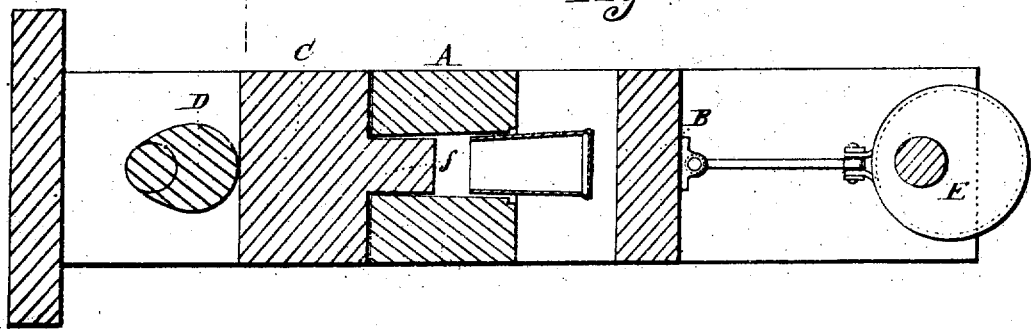

The cartridge-case being forced home, as shown in Figure 4, a cylindrical projection, *f*, upon the plate or follower C, is then elevated, by the cam D, and raises the tapered case from its seat, when it can be readily removed, and another substituted in its place.

My machine shows the method of pressing the shell into the tapered die by a follower, that takes on the base of the cartridge; but I claim the right to have the die in the follower, and to taper by the reverse means, setting the cartridge on its base or head, and pressing the follower down on to the shell, instead of pressing the shell, by a follower, into the die.

I am aware that George Wilson, in his patent of 1858, shows a cartridge-shell, of a taper-shape, in his drawings, though he claims no advantage from that shape, makes no mention of it in his specification, and there is nothing to show whether or how he ever manufactured one of those shells. His shell was, besides, made open at both ends. It was not intended to receive the fulminate in its flange, and even that flange itself was not so strengthened and sustained as to serve for the retracting-pin to seize hold of, in order to start it from its seat in the chamber.

I do not claim anything that is thus shown.

I am also aware of the patent of Hiram Berdan, dated February 27, 1866, in which he proposes, by the use of a die, to contract the open end of his cartridge-case, so as to grasp the bullet; but he not only has a solid body within his case, upon which it may be contracted, but contemplates the application of a blow, which would be fatal to the object proposed by me.

Berdan proposes only to contract the open end of his cartridge-case, while I contemplate giving it a uniform taper from end to end.

I make no claim to anything found in Berdan's patent.

Finally, I am aware that S. W. Wood, in his patent of 1862, and William Johnson, in his patent of nearly the same date, suggest the idea of a taper-shaped metallic cartridge-case, but they show no way in which such cases can be constructed successfully. Their inventions rest merely in idea. I do not pretend to be the first ever to have conceived such an idea, but only the first to have made it practical.

Having thus restricted the scope of what I deem my invention,

I claim, conjointly, the hereinbefore-described machine for, and method of tapering metallic cartridge-shells throughout their entire length, in the manner shown.

Witnesses: B. S. ROBERTS.

E. W. ANDERSON,

JULIUS HIRSCH.